July 10, 1962 J. C. DUMFORD 3,043,441
GROCERY BAG HOLDER FOR AUTOMOBILE TRUNKS
Filed Aug. 11, 1960
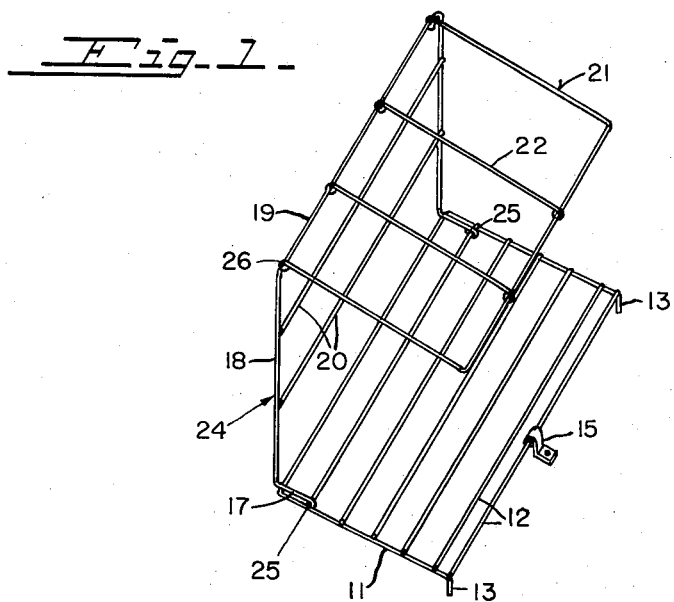
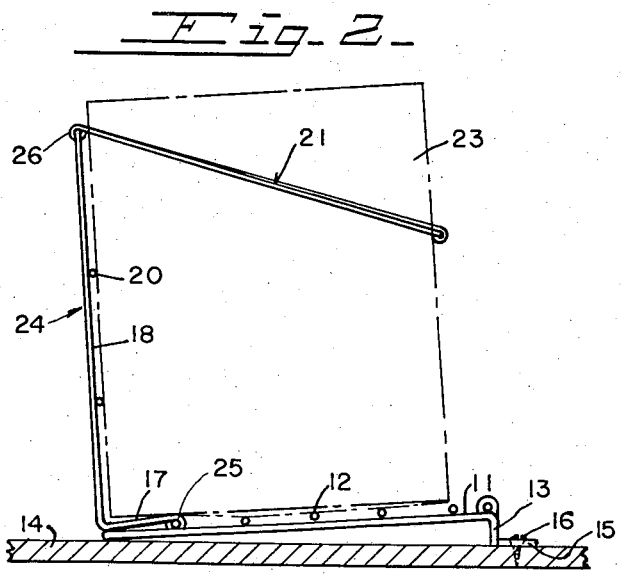
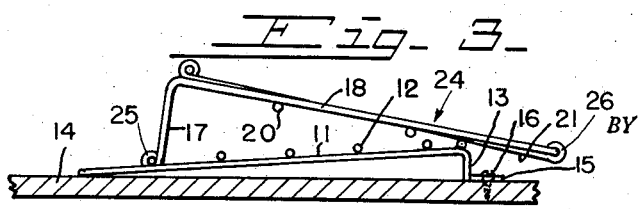
INVENTOR.
JOHN C. DUMFORD
BY
*H.C. Karl.*
ATTORNEY.

United States Patent Office 3,043,441
Patented July 10, 1962

3,043,441
GROCERY BAG HOLDER FOR AUTOMOBILE TRUNKS
John C. Dumford, 7969 Kenwood Road, Cincinnati 36, Ohio
Filed Aug. 11, 1960, Ser. No. 48,992
1 Claim. (Cl. 211—178)

This invention relates to a bag holder and more particularly to a collapsible grocery bag holder which can be attached to the floor of the trunk of an automobile.

The present trend in shopping at the super markets is to purchase large quantities of groceries which are placed in large bags on each trip to the market. These filled bags when placed in the automobile often fall over causing damage to the items in the bags. My improved holder is designed to hold the bags in an upright position at all times while transporting the groceries to the home.

The object of my invention is to provide a holder formed of rod material secured to the floor of the trunk of an automobile for holding bags of groceries in an upright position.

A further object is to provide a base, a foldable rear portion and divided pivoted upper portion to engage and hold bags of groceries in position on the base.

Further object will be apparent as the description progresses.

My invention will be further readily understood from the following description and claim, and from the drawings in which latter:

FIG. 1 is a perspective view of my improved bag holder.

FIG. 2 is an enlarged side view showing the holder engaging a bag of groceries.

FIG. 3 is a side view showing the holder collapsed.

My improved holder comprises a formed base 11 of rods having cross-braces 12 forming a supporting surface. The forward ends of the base 11 have feet 13 to set the base at an angle on the floor 14 of the trunk compartment of an automobile. A clip 15 secured to the forward brace 12 is arranged to be secured to the floor of the trunk, as by a screw 16 to hold the device in position on the floor of the trunk.

A rear supporting member 24 has inwardly extending legs 17 formed about the rear brace 12 and pivoted thereon as at 25 and has members 18 extending upwardly from the legs and forming a cross-bar 19 to form a rear support. When the rear support is in an upright position the legs rest on the base to hold the rear support in its upright position. Cross-braces 20 are attached to the upwardly extending members 18.

A pivoted bag holder 21 is formed in a U-shaped form having its ends 26 pivoted around the cross-bar 19 with divider bars 22 spaced apart to form bag holding compartments. When the device is not in use it can be folded as shown in FIG. 3 to assume a minimum of space in the trunk compartment.

Groceries at super markets are placed in bags of uniform size and the several bags can be placed on the base 11. The bag holder 21 is swung back prior to placing the bags on the base and then dropped over the bags 23 as shown in FIG. 2 to hold the bags in an upright position. Thus the groceries can be transported from the store to the home without damage to the contents of the bags.

Having thus fully described my invention, what I claim as new and desire to secure by Letters Patent, is:

A foldable bag holder arranged to rest on the floor of a trunk compartment of an automobile, comprising a base formed of a perimeter rod and transverse cross-rods attached to said perimeter rod, a foldable rear support pivotally connected to one of said cross-rods and bent at substantially right angles to form a rear upright support supported by the portion resting on the base when in upright position, and a divided holding frame pivotally connected to the top of said rear support for engaging and holding bags placed on said base.

References Cited in the file of this patent
UNITED STATES PATENTS

| | | |
|---|---|---|
| 434,514 | Lamb | Aug. 19, 1890 |
| 999,406 | Skelton | Aug. 1, 1911 |
| 1,605,506 | Brunhoff | Nov. 2, 1926 |
| 1,651,523 | Hamlin | Dec. 6, 1927 |
| 2,420,243 | Helms | May 6, 1947 |
| 2,519,711 | Sprechmann | Aug. 22, 1950 |